(12) United States Patent
Cornelius et al.

(10) Patent No.: US 8,418,230 B1
(45) Date of Patent: Apr. 9, 2013

(54) APPARATUS AND METHOD FOR MOBILE COMMUNICATIONS AND COMPUTING

(75) Inventors: Michael John Cornelius, Lane Cove West (AU); Steven Richard Collins, Lane Cove West (AU)

(73) Assignee: Netcomm Wireless Limited, Lane Cove (AU)

( * ) Notice: Subject to any disclaimer, the term of this patent is extended or adjusted under 35 U.S.C. 154(b) by 0 days.

(21) Appl. No.: 13/596,826

(22) Filed: Aug. 28, 2012

(51) Int. Cl.
*G06F 21/00* (2006.01)
*G06F 15/80* (2006.01)

(52) U.S. Cl. .................. 726/3; 713/189; 712/1

(58) Field of Classification Search ............ None
See application file for complete search history.

(56) References Cited

U.S. PATENT DOCUMENTS

| | | | |
|---|---|---|---|
| 7,296,754 B2 * | 11/2007 | Nishizawa et al. | 235/492 |
| 7,562,211 B2 * | 7/2009 | Paya et al. | 713/151 |
| 7,990,985 B2 * | 8/2011 | Chen | 370/401 |
| 2007/0011744 A1 * | 1/2007 | Carothers et al. | 726/24 |
| 2008/0282345 A1 * | 11/2008 | Beals | 726/21 |
| 2009/0259857 A1 * | 10/2009 | Gehrmann | 713/193 |
| 2009/0323640 A1 * | 12/2009 | Chakrabarti et al. | 370/335 |
| 2009/0325615 A1 * | 12/2009 | McKay et al. | 455/466 |
| 2010/0250497 A1 * | 9/2010 | Redlich et al. | 707/661 |
| 2010/0333193 A1 * | 12/2010 | Goding et al. | 726/16 |
| 2011/0197256 A1 * | 8/2011 | Sharkey et al. | 726/1 |
| 2012/0151476 A1 * | 6/2012 | Vincent | 718/1 |
| 2012/0291089 A1 * | 11/2012 | Bomgardner et al. | 726/1 |

* cited by examiner

*Primary Examiner* — Christopher Revak
(74) *Attorney, Agent, or Firm* — Birch, Stewart, Kolasch & Birch, LLP

(57) ABSTRACT

A wireless computing and communications device comprises a baseband processor configured to implement operations providing access to a wireless communications network, and an application processor configured to execute user applications. A communications management processor communicates with the baseband processor and the application processor by respective first and second communications channels. The communications management processor is configured to operate in a separate security domain from the application processor, and to mediate all access to the wireless communications network by the user applications.

26 Claims, 6 Drawing Sheets

APPARATUS AND METHOD FOR MOBILE COMMUNICATIONS AND COMPUTING

FIELD OF THE INVENTION

The present invention relates to mobile computing and communications devices, and in particular to improvements in monitoring and management of such devices by network operators.

BACKGROUND TO THE INVENTION

Over the course of the past two decades, digital mobile telephony has developed into one of the largest and most ubiquitous platforms in history. The current number of global connections is estimated to be around six billion, with around 1.5 billion new devices being added each year. In addition to mobile telephones, smart phones, tablets and other familiar mobile computing and consumer products, mobile telephony systems are increasingly utilised in machine-to-machine (M2M) applications, with new applications being continuously developed. Examples of M2M applications include remote monitoring of equipment, connected smart meters, remote control of home and office appliances, and in-vehicle connectivity for navigation, maintenance and support.

To date, however, the administration of mobile telephony devices, including consumer and M2M applications, has proven a challenge for mobile network operators.

On the one hand, users of consumer computing and communications devices desire freedom to use those devices in a manner which best suits their individual requirements, while developers of M2M applications similarly desire freedom to implement required functionality regardless of the underlying network technology and operational concerns. On the other hand, mobile network operators are concerned to ensure that network resources are used efficiently and effectively, that the applications of individual users and devices are not permitted to adversely impact the performance of the network for other subscribers, and that the consumption of network resources is appropriately monitored, managed and billed.

At present, mobile network operators have limited control over the manner in which end-user devices utilise network resources. Subscribers are understandably concerned about allowing network operators higher levels of access and control over their devices, not least because of concerns regarding security and privacy of personal information and network usage patterns.

In view of the limited control over devices once they are deployed within the mobile telephony network, it is presently common for mobile network operators to implement extensive mobile device approval processes. While these processes are intended to ensure that devices connected to the network do not impact adversely on overall performance, increasingly feature rich devices which permit the installation of additional applications by the end-user following approval, result in the management of device communications becoming increasingly out of the control of the mobile network operators.

For example, it is possible for poorly written applications executing on approved devices nonetheless to consume (perhaps unintentionally) excessive network resources, potentially resulting in denial of service to other users. Additionally, large populations of identical automated M2M devices may generate undesirable scenarios, such as devices attempting to simultaneously reconnect to a mobile network at activation or restoration of services. Furthermore, even if network performance is not adversely impacted, applications which (intentionally or unintentionally) make excessive use of network resources may result in high usage charges being billed to consumers, which may create financial difficulties, and cause adverse publicity for the mobile network operator.

It would therefore be desirable to provide an improved mobile computing and communications platform which enables enhanced monitoring and management of mobile devices by network operators, while at the same time permitting users and applications developers the freedom to operate according to their own requirements, without compromising security and privacy. It would also be desirable to provide a mobile computing and communications platform which enables network resource utilisation to be controlled by network operators, users, and individual applications, to ensure compliance with relevant terms of service, and to impose cost controls or constraints. It would also be desirable to provide a mobile computing and communications platform which provides users and applications developers with a simple and consistent interface for mobile network access regardless of the underlying wireless network technology.

It is accordingly an object of the present invention to address one or more of these desired features.

SUMMARY OF THE INVENTION

According to embodiments of the invention, there is provided a wireless computing and communications device comprising:

a baseband processor configured to implement operations providing access to a wireless communications network;

an application processor configured to execute user applications; and a communications management processor, in communication with the baseband processor via a first communications channel, and with the application processor via a second communications channel, wherein the communications management processor is configured to operate in a separate security domain from the application processor, and to mediate all access to the wireless communications network by user applications executing on the application processor.

Advantageously, the provision of a communications management processor operating in a separate security domain enables the isolation of applications executing on the application processor from the facilities and features of the baseband processor which are utilised to access the wireless communications network. In embodiments of the invention, the communications management processor mediates access to the wireless communications network, providing applications with a uniform, consistent, stable and simple interface to wireless communications services, while at the same time enabling the use of wireless network resources to be monitored, managed and controlled within the communications management processor.

A further advantage of embodiments of the invention is the ability for a wireless network operator to communicate with the communications management processor in order to monitor, manage and control the use of network resources via the wireless computing and communications device, while being isolated from access to the application processor, and associated user data and applications, thereby addressing user privacy and security concerns.

In some embodiments, the device comprises a single central processing unit (CPU) core which is configured to execute a virtual machine manager (VMM), wherein each of the baseband processor, communications management processor, and application processor execute within a distinct virtual machine (VM) managed by the VMM.

Such embodiments advantageously have a beneficial bill of materials (BOM) cost, due to integration of all three processors into a single integrated circuit (IC). An additional advantage is a high degree of security and integrity, since all three processors, and the first and second communications channels, are fully integrated into a single IC, and are not externally accessible.

In other embodiments, the device comprises at least first and second CPU cores, in communication via an inter-core communications channel, wherein the first CPU core executes a VMM, and wherein the baseband processor and communications management processor execute within distinct VMs managed by the VMM on the first CPU core, and the application processor executes on the second CPU core. In some embodiments the first and second CPU cores are located on a single IC chip. In some embodiments the first and second CPU cores are located on separate IC chips.

In some embodiments the baseband processor comprises a first IC chip, and the wireless computing and communications device comprises a second IC chip including one or more CPU cores, the second IC chip communicating with the first IC chip via the first communications channel, wherein the communications management processor and the application processor execute on the one or more CPU cores of the second IC chip.

Further embodiments of the invention may employ other combinations of integrated and discrete IC components and CPU cores. In general, the baseband processor, application processor and communications management processor are each logically distinct components of embodiments of the invention, but need not be physically separate components, depending upon the chosen implementation. Further benefits and advantages of different implementations will be apparent from the detailed description of embodiments set out below.

In embodiments of the invention, the communications management processor is configured to implement a security management function, said security management function restricting access to a secure configuration data store to functions executing within the communications management processor security domain.

The communications management processor may be further configured to receive and verify requests to modify contents of the secure configuration data store from trusted sources in the wireless communications network, and trusted applications executing on the application processor, and to update the contents in the event that the verification is successful.

In embodiments of the invention, the communications management processor is configured to implement a database management function, said database management function communicating with the application processor via the second communications channel and providing access to a data store to applications executing on the application processor.

Advantageously, the database management function is configured to selectively provide read-only or read/write access by applications executing on the application processor to information held in the data store.

In embodiments of the invention, the communications management processor is configured to implement a connection management function, the connection management function communicating with the baseband processor via the first communications channel to provide access to the wireless communications network in response to requests received via the second communications channel from applications executing on the application processor.

Exemplary operations provided by the connection management function in response to requests comprise one or more of: connection set-up; connection termination; connection status; virtual connection set-up; and virtual connection termination.

According to embodiments of the invention, the connection management function is further configured to provide access to the wireless communications network in response to requests received from functions executing within the communications management processor security domain. Advantageously, this enables the communications management processor to maintain its own private connections within the wireless communications network, for example for communications with network operator and management functions, with such connections not being accessible to user applications.

In embodiments, the communications management processor is configured to implement a policy enforcement function, said policy enforcement function policing communication flows between the application processor and the baseband processor via the first and second communications channels, and controlling the communications flows in accordance with associated rules. In embodiments of the invention, the communication flows comprise one or more of: data flows; voice flows; and text-messaging flows.

In embodiments, the policy enforcement function is configured to receive the associated rules from one or more of:
a secure configuration data store within the communications management processor security domain;
the wireless communications network via the first communications channel; and
applications executing on the application processor via the second communications channel.

According to an embodiment of the invention, each associated rule comprises a combination of one or more of:
an interface to which the rule is applied;
maximum and/or minimum sustained throughput per unit time;
maximum permissible burst rate;
packet size;
queuing mechanisms;
queue buffer sizes;
application types;
source/destination address;
source/destination port;
time schedules;
match actions; and
rule priority.

According to embodiments of the invention, each associated rule is applied to one or more of:
a corresponding application executing on the application processor;
all applications executing on the application processor; and
one or more communication flows.

In embodiments, the policy enforcement function is further configured to control timing and/or rate of connection requests or transmissions to the wireless network according to wireless network configuration rules.

According to embodiments of the invention, the device comprises a diagnostics, monitoring and control function configured to provide one or more diagnostic/management interfaces accessible via the wireless network. Exemplary diagnostic/management interfaces include SSH, SNMP, IEEE 802.1ag (ITU-T Y.1731), TR-069, OMA-DM and Web UI.

Embodiments of the invention further provide a method of operating a wireless computing and communications device comprising:

executing wireless communications management functions by a communications management processor in communication with a baseband processor via a first communication channel and with an application processor via a second communication channel, wherein the baseband processor is configured to implement operations providing access to a wireless communications network, the application processor is configured to execute user applications, and wherein the wireless communications management functions execute within a separate security domain from the application processor, and mediate all access to the wireless communications network by user applications executing on the application processor.

In embodiments of the invention, the communications management functions comprise a security management function, and the method comprises the security management function restricting access to a secure configuration data store to functions executing within the communications management function security domain.

In embodiments of the invention the communications management functions comprise a database management function, and the method comprises the database management function communicating with the application processor via the second communications channel and providing access to a data store to applications executing on the application processor.

In embodiments of the invention, the communications management functions comprise a connection management function, and the method comprises the connection management function communicating with the baseband processor via the first communications channel to provide access to the wireless communications network in response to requests received via the second communications channel from applications executing on the application processor.

In embodiments of the invention the communications management functions comprise a policy enforcement function, and the method comprises the policy enforcement function policing communication flows between the application processor and the baseband processor via the first and second communication channels and controlling the communication flows in accordance with associated rules.

In embodiments of the invention the communications management functions comprise a diagnostics, monitoring and control function, and the method comprises the diagnostics, monitoring and control function implementing one or more diagnostic/management interfaces accessible via the wireless communications network.

Further features and benefits of embodiments of the invention will be apparent to persons skilled in the relevant arts from the following description of exemplary embodiments, which is provided by way of illustration only, and is not intended to be limiting of the scope of the invention as defined in any of the preceding statements, or in the appended claims.

BRIEF DESCRIPTION OF THE DRAWINGS

Embodiments of the invention will now be described with reference to the accompanying drawings, in which like reference numerals refer to like features, and wherein.

DETAILED DESCRIPTION OF EMBODIMENTS

Figure 1:
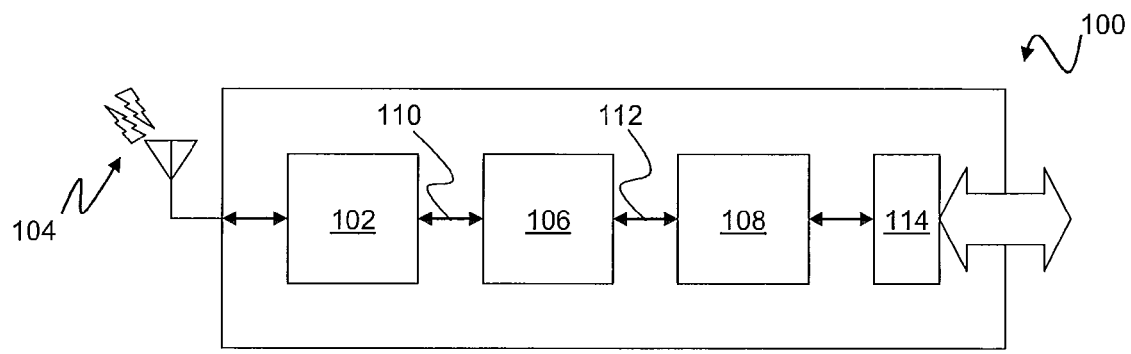
FIG. 1 is a block diagram illustrating a logical structure of a wireless computing and communications device embodying the invention.

FIG. 1 is a block diagram 100 illustrating a logical structure of a wireless computing and communications device embodying the present invention.

The device 100 comprises a baseband processor 102, which is responsible for implementation of a variety of functions relating to the transmission and reception of communications signals via a wireless network interface 104. For example, the baseband processor 102 typically implements management and communications functions for accessing a cellular wireless communications system, such as a system implemented in accordance with GSM, CDMA, WiMAX, 3G or LTE standards. The baseband processor 102 may also include further wireless network processing functions, such as functions associated with wireless LAN access and/or Bluetooth.

The device 100 further comprises a communications management processor 106, which is in communication with the baseband processor 102 via a first communications channel 110. As will be described in greater detail below, with reference to FIG. 2, the communications management processor 106 is logically separate from the baseband processor 102, although in some embodiments the two processors 102, 106 may not be physically separate, but rather may be implemented within a single integrated circuit (IC) device.

The device 100 further includes an application processor 108, which is in communication with the communications management processor 106 via a second communications channel 112. Again, the application processor 108 is a logically separate component of the device 100, but need not be a physically separate component.

Additionally, the device 100 includes a number of peripheral interfaces 114. Depending upon the intended applications of the device 100, different embodiments may include a different set of peripheral interfaces 114. For example, an embedded computing and communications device, for use in machine-to-machine (M2M) applications may include peripheral interfaces such as: an Internet interface; USB host and/or device interfaces; other serial or parallel input/output interfaces; and wired telephony interfaces. A computing and communications device intended for consumer use, such as a mobile telephony handset, smart phone, portable computing device or tablet, may include further peripheral interfaces 114, such as: a display device; input means such as keypads, keyboards, touchscreens; audio interfaces, such as a microphone, speakers and/or headset connection; and so forth.

In accordance with embodiments of the invention, the communications management processor 106 is configured to operate in a separate security domain from the application processor 108, and to mediate all access to the wireless communications network 104 by user applications executing on the application processor 108. The communications management processor 106 may also be configured to operate in a separate security domain from the baseband processor 102.

A device 100 configured in accordance with an embodiment of the invention is thereby able to manage, control and/or restrict access by user applications executing on the application processor 108 to resources associated with the communications management processor 106, such as device and network configuration data, as well as both facilitating and controlling access by user applications to the facilities of the baseband processor 102 and resources of the wireless network 104.

Additionally, a wireless network operator may be enabled to communicate with the communications management processor 106, in order to manage, control and/or configure various features, functions and capabilities of the device 100 in a manner which is secure from interference or interception by user applications. At the same time, the communications management processor 106 can restrict access by the wireless network operator to user data and application information, thereby addressing potential privacy concerns associated with network operator access to customer devices 100.

Figure 2A:
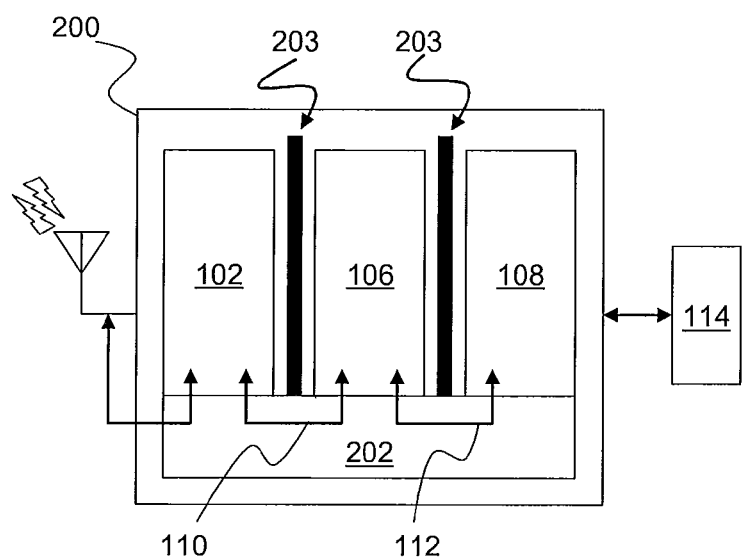
FIGS. 2(a), (b) and (c) are schematic diagrams illustrating embodiments of the baseband processor, communications management processor, and application processor of the device of FIG. 1.
Figure 2B:
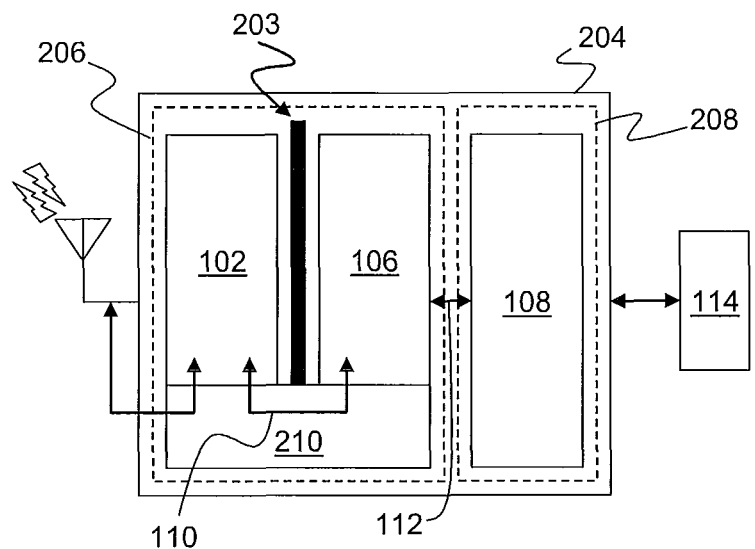
Figure 2C:
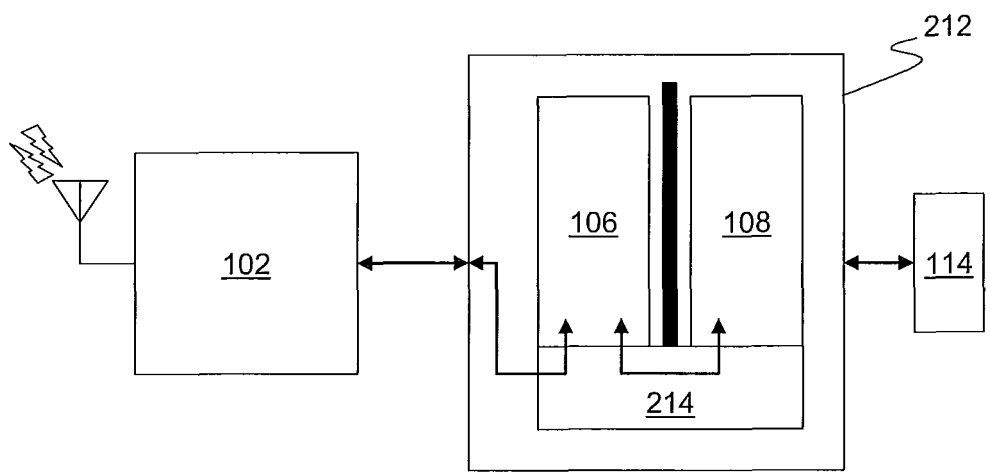

FIGS. 2(*a*), 2(*b*) and 2(*c*) illustrate three exemplary implementation options for the baseband processor 102, the communications management processor 106 and the application processor 108, all embodying the invention.

FIG. 2(*a*) is a schematic diagram illustrating an embodiment implemented using a single central processing unit (CPU) core 200. A virtual machine manager (VMM) 202 (also known as a 'hypervisor') executes on the single CPU core 200. For example, embodiments of the invention may employ the OKL4 Microvisor VMM which is available from Open Kernel Labs of Sydney, Australia. As shown, the VMM 202 provides three virtual machines, within which the baseband processor 102, the communications management processor 106 and the application processor 108 respectively execute. The VMM 202 isolates each of these virtual machines from the others, as indicated by the firewalls 203. The VMM 202 also provides hardware abstractions enabling access to peripheral devices 114, the wireless network interface 104, and facilitating communications channels 110, 112 between the baseband processor 102, the communications management processor 106 and the application processor 108.

An alternative embodiment is shown in FIG. 2(*b*), which is based upon a single IC device 204 which comprises two internal CPU cores 206, 208. In this embodiment, a VMM 210 executes on a first CPU core 206, providing two virtual machines within which the baseband processor 102 and the communications management processor 106 respectively execute. The VMM 210 also provides hardware abstractions facilitating access to the network interface 104 by the baseband processor 102, access to an internal communications channel 112 between the first and second CPU cores 206, 208, and enabling communications between the baseband processor 102 and the communications management processor 106.

According to a further embodiment, illustrated in FIG. 2(*c*), the baseband processor 102 is provided as a separate device, and an additional IC 212 is used to implement the communications management processor 106 and the application processor 108. In the embodiment shown, the IC 212 comprises a single CPU core, within which a VMM 214 executes to provide separate virtual machines implementing the communications management processor 106 and the application processor 108.

As will be appreciated, the exemplary implementations illustrated in FIGS. 2(*a*), 2(*b*), and 2(*c*) are not limiting of the scope of the invention, and further variations will be apparent to persons skilled in the relevant art of digital hardware and software design. For example, the baseband processor 102, the communications management processor 106 and the application processor 108 may be implemented via three separate IC devices, or via three separate CPU cores embodied within a single IC device. Other combinations are also possible.

Each of the one or more IC devices employed in embodiments of the invention may be a microprocessor with associated memory, including non-volatile memory for storing programs and configuration data, and volatile memory for storage of temporary working data and variables, such as state information and variables maintained in a stack, heap or other managed memory store. Alternatively or additionally, each of the one or more IC devices may be an application-specific IC (ASIC), system-on-chip (SOC) device, comprising various processor, memory and peripheral subsystems implementing the requires functions in accordance with an embodiment of the invention. In some embodiments, one or more of the IC devices may be a full custom IC, specifically designed to implement required functionality. All such variations and combinations of implementations and options may fall within the scope of embodiments of the invention.

As will also be appreciated, different implementations of the baseband processor 102, the communications management processor 106, and the application processor 108 provide different benefits.

For example, the single IC, single core embodiment of FIG. 2(*a*) has the lowest bill-of-materials (BOM) cost implementation, and the highest levels of security, since all communications between the three logical processors are contained within a single physical device.

The single IC, dual CPU core embodiment of FIG. 2(*b*) retains the benefit of a low BOM cost implementation, while increasing the overall performance due to the provision of an additional CPU core. This embodiment also retains the benefit of high security, by maintaining all communications within a single physical device.

The embodiment of FIG. 2(*c*) has the benefit of improved flexibility, since the baseband processor 102 may be implemented using any available components, sourced from a wide range of different manufacturers. Furthermore, the provision of a dedicated baseband processor 102 enables improved performance of the communications management processor 106 and the application processor 108, due to the reduced load on the resources of the processing IC 212. The trade-off with this embodiment is that security is reduced, because communications between the baseband processor 102 and the communications management processor 106 may be physically intercepted. However, security could be enhanced by encrypting communications across the first communications channel 110, where supported by both the baseband processor 102 and the communications management processor 106.

In yet another alternative embodiment (not shown) a two-chip solution comprises providing a single IC for implementation of the baseband processor 102 and communications management processor 106, while using a separate, stand-alone, application processor chip. This embodiment provides the flexibility to select any desired application processor chip or core, while maintaining a reasonable level of security, since communications between the communications management processor 106 and the baseband processor 102 are not physically accessible.

It will be appreciated, therefore, that computing and communications devices configured in accordance with the logical structure 100 embodying the present invention provide a great deal of design and implementation flexibility, enabling application-specific trade-offs to be achieved between parameters such as cost, performance and security.

Figure 3:
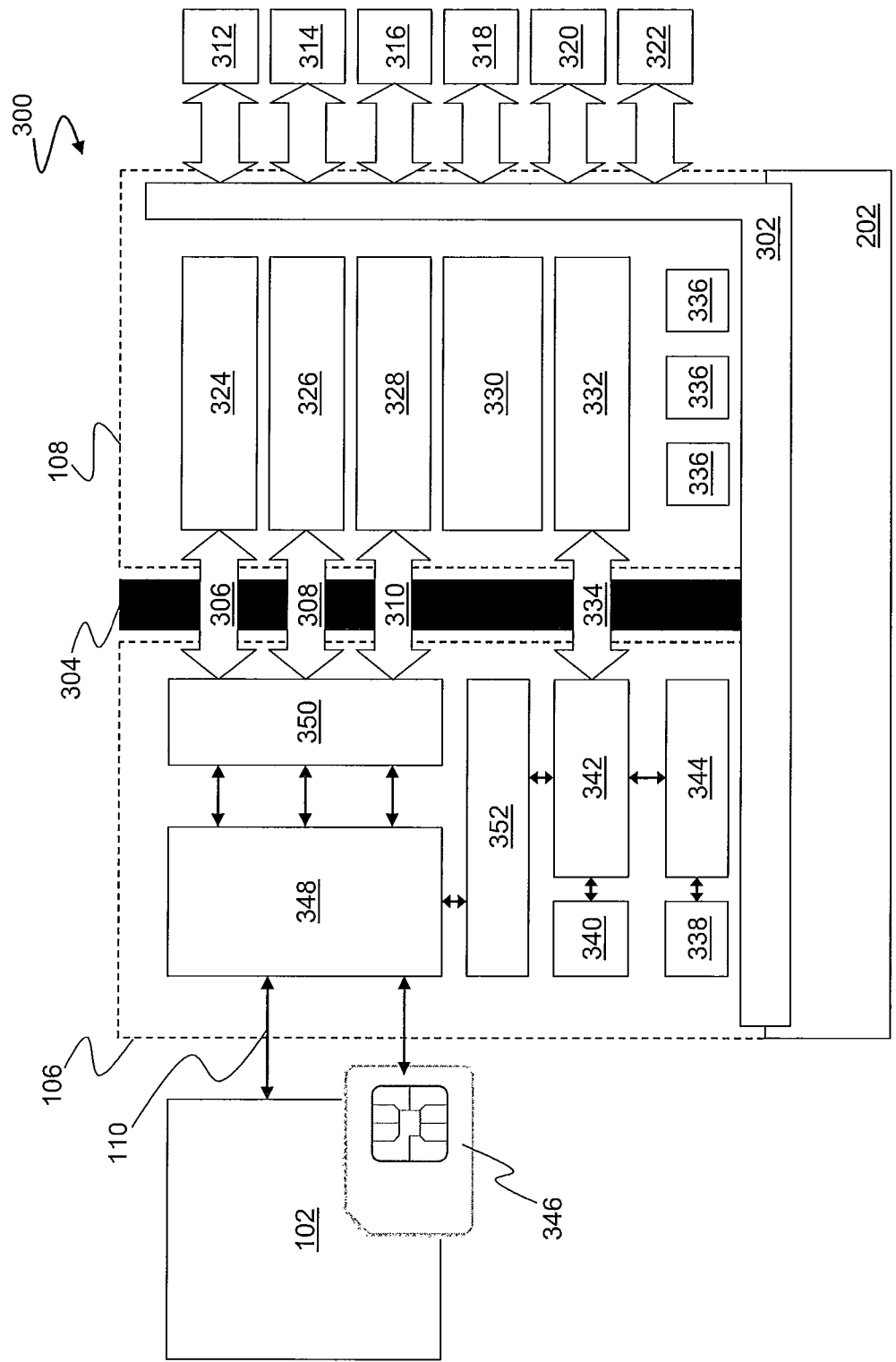
FIG. 3 is a block diagram illustrating a system architecture according to an embodiment of the invention.

Turning now to FIG. 3, there is shown a block diagram 300 illustrating a system architecture embodying the invention. The architecture 300 envisages an implementation in which the communications management processor 106 executes within a secure zone, and the application processor 108 executes within a user zone. The secure zone and the user zone comprise separate security domains, such that access to resources (i.e. functions and data) within the secure zone, by applications executing within the user zone 108, is restricted. As described above, the secure zone and the user zone, and the associated communications management processor 106 and application processor 108, may comprise separate physical devices, distinct CPU cores, or different virtual machines executing on a single CPU core under the control of a VMM.

The processors 106, 108 implemented within the secure zone and the user zone are provided with access to resources external to the respective zones via a hardware abstraction layer (HAL) 302. In a virtual machine implementation, the HAL is implemented by the VMM. In a multi-core, or multi-IC implementation, the HAL 302 may be provided by a supervisory software function, by virtual hardware devices, and/or by physical hardware interfaces.

Consequently, the secure zone and the user zone, and the associated processors 106, 108, are effectively isolated from one another by a 'firewall' 304.

Communications between the application processor 108 and the communications management processor 106 occur via the second communications channel 112 illustrated in the block diagram 100. In the exemplary architecture 300 a number of virtual communications channels are provided. These include a packet data channel 306, a voice channel 308, and a text messaging channel 310. All of these channels are provided via suitable abstractions implemented in the HAL 302.

The HAL 302 similarly provides access to physical peripheral interfaces, such as an Ethernet interface 312, a USB host interface 314, a USB device interface 316, other parallel or serial input/output interfaces 318, a wired telephony interface 320, and human user input/output devices 322, such as displays, keypads, touchscreens and the like.

The application processor 108 executing within the user zone comprises an operating system environment, such as a Linux operating system environment. This provides a convenient and familiar platform for the implementation of applications and other software for execution within the user zone. Access to the communications channel 112 via the HAL 302 is facilitated by the provision of device drivers exposing conventional driver interfaces within the familiar operating system environment. For instance, access to the virtual data communications channel 306 is provided to applications via a standard network interface driver 324. Access to the virtual voice channel 308 is provided via a standard sound interface driver 326, such as a driver implemented in accordance with the Advanced Linux Sound Architecture (ALSA) in the case of a Linux operating system environment. Access to the virtual text messaging channel 310 may be provided via a standard virtual COM Port AT interface driver 328.

The operating system environment within the user zone also provides a full read/write file system facility 330. The file system 330 may be based on volatile or non-volatile solid state memory (e.g. RAM or flash memory), and/or may include additional peripheral storage devices, such as a hard disk drive.

Additionally, the architecture 300 provides a configuration database interface process 332. This process enables applications executing within the user zone to read and write relevant configuration and other information which may be stored within the secure zone, via a virtual storage interface channel 334.

Also executing on the application processor 108 within the user zone are one or more user applications 336.

As will be appreciated, according to the architecture 300 the user applications 336 have access to a full complement of operating system resources provided by the Linux environment. Application development is therefore supported by wide familiarity with this environment, and its industry-standard interfaces. Furthermore, a supplier of systems and devices made in accordance with the architecture 300 can also provide additional software development kits (SDKs) adding support for rapid development of applications using facilities provided by the data, voice and text interfaces 324, 326, 328, and the storage/access facilities provided by the process 332. From the perspective of an application developer, establishing a data, voice or text communications channel is as simple as accessing the available network and/or device driver facilities of the host operating system, with all of the details associated with establishing, maintaining and monitoring connections over the wireless communications network being implemented by the communications management processor 106 within the secure zone.

According to embodiments of the invention, a similar host operating system environment, e.g. a Linux environment, is provided for implementation of the communications management processor 106. The operating system environment within the secure zone is completely separate from the operating system environment within the user zone. Applications, processes and threads executing within each zone have no direct access to resources of the other zone. All access between the two zones must occur via the HAL 302.

Within the secure zone, storage is provided (e.g. non-volatile storage, such as flash memory) for holding configuration data, and other information relating to the operations of the wireless computing and communication device. The storage may be divided into a secure storage facility 338 and a non-secure storage facility 340. Access to the storage facilities is via a storage manager 342 and a security manager 344. The storage manager 342 is accessible to applications 336 executing within the user zone via the process 332, and/or via a suitable virtual device driver. Applications 336 are thereby able to request that specific data be stored in, or retrieved from, the non-secure storage zone 340. Information within the non-secure storage facility 340 may be read only, or read/write, under control of the storage manager 342. Access to the secure storage facility 338 is available only via the security manager 344. Access to the secure storage facility 338 may be, for example, restricted to processes executing within the secure zone. Access from outside the secure zone will not be permitted, in the absence of appropriate verified security credentials. For example, access to the secure storage facility 338 may be permitted via the wireless network in the case of authenticated connections established by the wireless network operator, or a device owner/operator.

Processes and functions executing within the secure zone are able to access the baseband processor 102 via the communications channel 110. In the case of a device having access to a cellular wireless network, such as a GSM, 3G or LTE network, a SIM card 346 will be provided, which is accessible to the baseband processor 102 and to communications management processor functions executing within the secure zone which require access to configuration and storage data contained within the SIM card 346.

In particular, a connection management function 348 is implemented within the communications management processor 106. The connection management function 348 provides an abstracted interface to the facilities of the wireless network, as exposed via the baseband processor 102. The connection management function 348 is responsible for establishing and maintaining connectivity to the wireless network. In addition to supporting connections such as packet data, voice and video, the connection management function also supports virtual connections such as VPN tunnels. In the case of virtual connections, the connection management function also manages any associated dependencies required to support each virtual connection (e.g. the underlying physical connections and their resources).

The connection management function manages connection set-up and failure, in accordance with the requirements of the wireless network operator, including the implementation of retry timers and counters, and so forth. It also supports private management connections which are visible only to other processes executing within the secure zone. Management traffic carried over such private connections may be separated from user traffic by using a separate packet data network or virtual circuit.

In addition, the connection management function 348 provides the application processor 108 with a consistent interface for configuring, monitoring and using all network interfaces independently from the underlying wireless network type and configuration. The connection management function 348 simplifies the set-up and management of virtual circuits.

The communications management processor 106 also comprises a policy enforcement function 350. The policy enforcement function sits logically between the communications channel 112 and the connection management function 348, and implements access, rate limiting and other policing functions within the communications management processor 106. A 'policy' in this context is a set of rules defining parameters for traffic carried via the wireless network. Rules may be established for various parameters including, without limitation: the interface to which the rules are applied; maximum and/or minimum sustained throughput per unit time; maximum permissible burst rate; packet size; queuing mechanisms; queue buffer sizes, application types; source/destination address; source/destination port; time schedules; match actions (e.g. drop/forward); and rule priority.

Policies may be applied to the overall levels of data, voice and/or text traffic, or may be applied to particular application channels, virtual connections, or other communications resources. Policies may be established by the wireless network operator, enabling improved service offerings by controlling the way in which a device embodying the invention is able to use network resources. Alternatively, or additionally, policies may be established by particular applications, enabling the applications (and end-users of the device) to gain better control of their use of the wireless network through policies. For example, it may be possible for the end-user to control cost of operation of the device by limiting rates and/or times of transmission of messages.

Policies and associated rules may be stored within the non-secure or secure storage facilities 340, 338. Preferably, policies established by the wireless network operator are stored as configuration data within the secure storage facility 338, so that they cannot be accessed in any circumstances by user applications 336. Application policies may be stored within either secure or non-secure facilities 338, 340, or may simply be held within temporary storage managed by the policy enforcement function 350, since they will typically be re-established by an application each time it is executed.

In the event that a policy is configured both by the wireless network operator, and by a user application, the policy enforcement function will apply the most restrictive of the conflicting policies. A user application cannot override a restriction or limit which has been imposed via a wireless network operator policy.

Additionally, the communications management processor 106 may be configured to provide network usage levelling, by enforcing a distribution of network service consumption over time across a population of devices. For example, a particular device owner may have an application which involves monitoring of a number of remote sites, all of which require access to a single wireless network in order to transmit and receive monitoring and configuration information. In the event of a network congestion or outage event, all of the devices may respond simultaneously, e.g. by reinitialising at the same time, once the network becomes available. Policies and/or other features of the communications management processor 106 enable devices to be configured such that they do not restart, or reinitialise, simultaneously. This configuration may be implemented remotely, and is independent of any individual user applications, and may be implemented by batching and queuing connection requests and/or transmissions submitted by the application processor 108. This facility enables devices to be deployed which are more network-friendly, or 'better behaved', without the need to modify any user applications in order to achieve this benefit.

A diagnostics, monitoring and control function 352 is also provided within the communications management processor 106 executing within the secure zone. The diagnostics, monitoring and control function 352 interacts with the connection management function 348 in order to monitor the status of network connections, and also to establish and maintain its own private connections to the wireless network 104, as required. The diagnostics, monitoring and control function 352 is also able to access other configuration and status information relating to the operation of the device 100 and the communications management processor 106, such as configuration and status information recorded in the storage facilities 338, 340 maintained by the storage management function 342 and the security management function 344.

The diagnostics, monitoring and control function 352 also has access to facilities and resources of the baseband processor 102, via the connection management function 348.

The diagnostics, monitoring and control function 352 enables a wireless network operator to conduct diagnostics and network management functions relevant to the operations of the wireless network, on the baseband processor 102 and the communications management processor 106. The diagnostics, monitoring and control function 352 has no access to user or application data maintained within the user zone, ensuring that user privacy cannot be compromised.

The diagnostics, monitoring and control function 352 may provide standard diagnostic/management interfaces such as SSH, SNMP, IEEE 802.1ag (ITU-T Y.1731) and Web UI.

Features of the diagnostics, monitoring and control function 352 are activated and accessed, if required, by the wireless network operator via the wireless network 104. If enabled, these features are permanently available, and do not require user or application intervention in order to be established.

Figure 4:
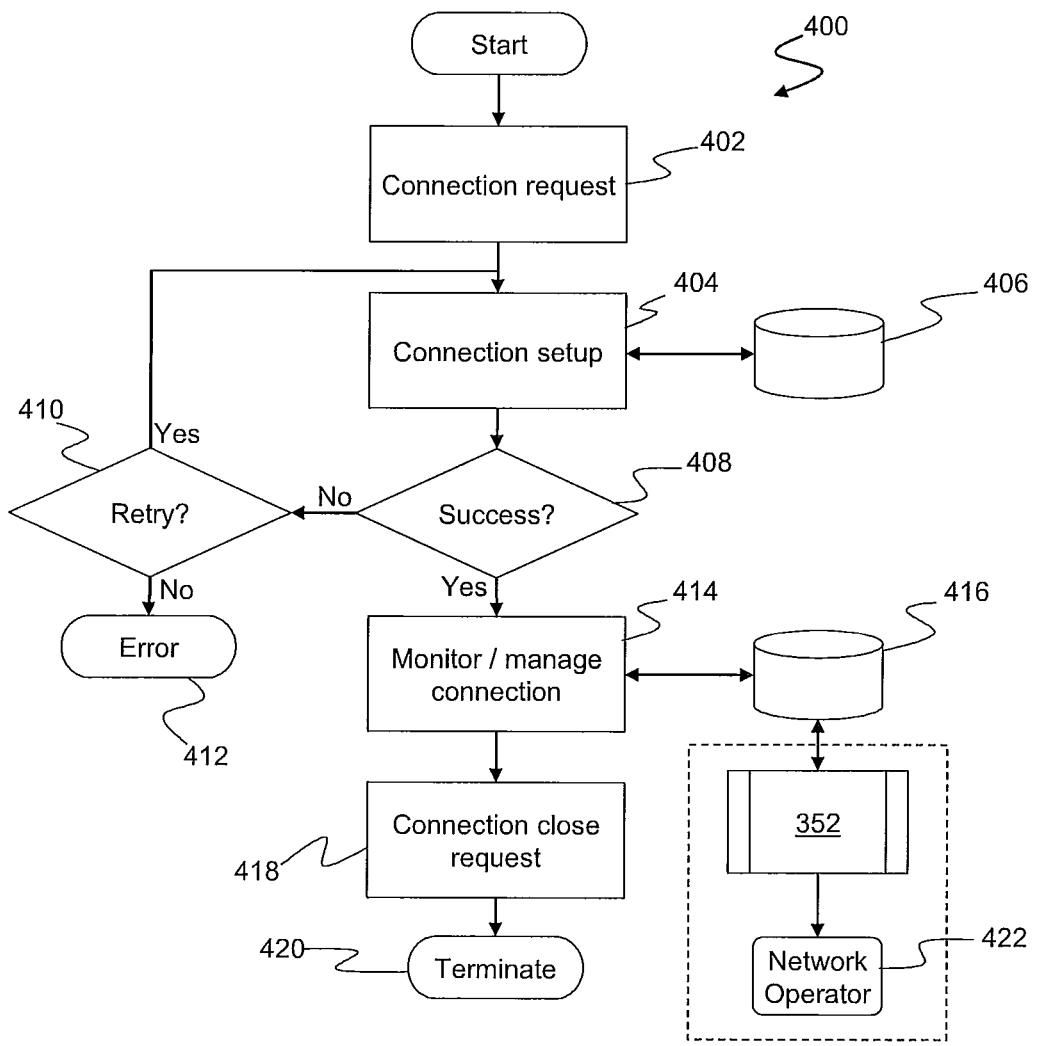
FIG. 4 is a flowchart illustrating general functions of a connection manager and diagnostics, monitoring and control function embodying the invention.

Turning now to FIG. 4, there is shown a flowchart illustrating the general facilities provided by the connection management function 348 and the diagnostics, monitoring and control function 352. The connection management function 348 receives connection requests 402, which may originate within the user zone of the application processor 108, within the communications management processor 106, or via the wireless network 104. The connection management function 348 is responsible for tasks associated with connection set-up 404 in response to the connection request. Whether or not the requested connection is established, and any relevant parameters of the connection, may be determined in accordance with rules or policies 406, which may be maintained within the storage facilities 338, 340.

Any errors or exceptions which occur in the course of connection set-up are managed by the connection management function 348. If some type of failure is detected 408, then the connection management function will determine 410 whether or not it should retry the connection set-up 404. For example, connection attempts may be repeated for a predetermined time, or for a predetermined number of attempts, and may be subject to a minimum time interval between retries, depending on configuration parameters, rules and/or policies. In the event that a connection cannot be established after further attempts, an error 412 may be generated by the connection management function 348.

Once a connection is established, the connection management function 348 continues to monitor and manage 414 the connection. This may include monitoring parameters of the connection, and recording its status and other management information within a storage facility 416. Monitoring and managing of existing connections may also include re-establishing connections in the event of a failure.

When a connection-close request 418 is received, the connection management function 348 is responsible for performing the operations necessary to tear down or terminate the connection 420.

All of these operations of the connection management function 348 are performed using communications with the baseband processor 102 via the first communications channel 110. The connection management function 348 is thus the only component of the communications management processor 106 which is required to interface with the baseband processor 102, and thus provides a uniform, abstracted, interface to all connection management features which is available to other functions within the communications management processor 106, as well as to user applications 336 executing on the application processor 108.

Status and management information recorded by the connection management function 348 in the storage 416 may be accessed by the diagnostics, monitoring and control function 352, and made available to the wireless network operator 422 via the network 104, using one or more of the network management interfaces/protocols implemented within the diagnostics, monitoring and control function 352.

Figure 5:
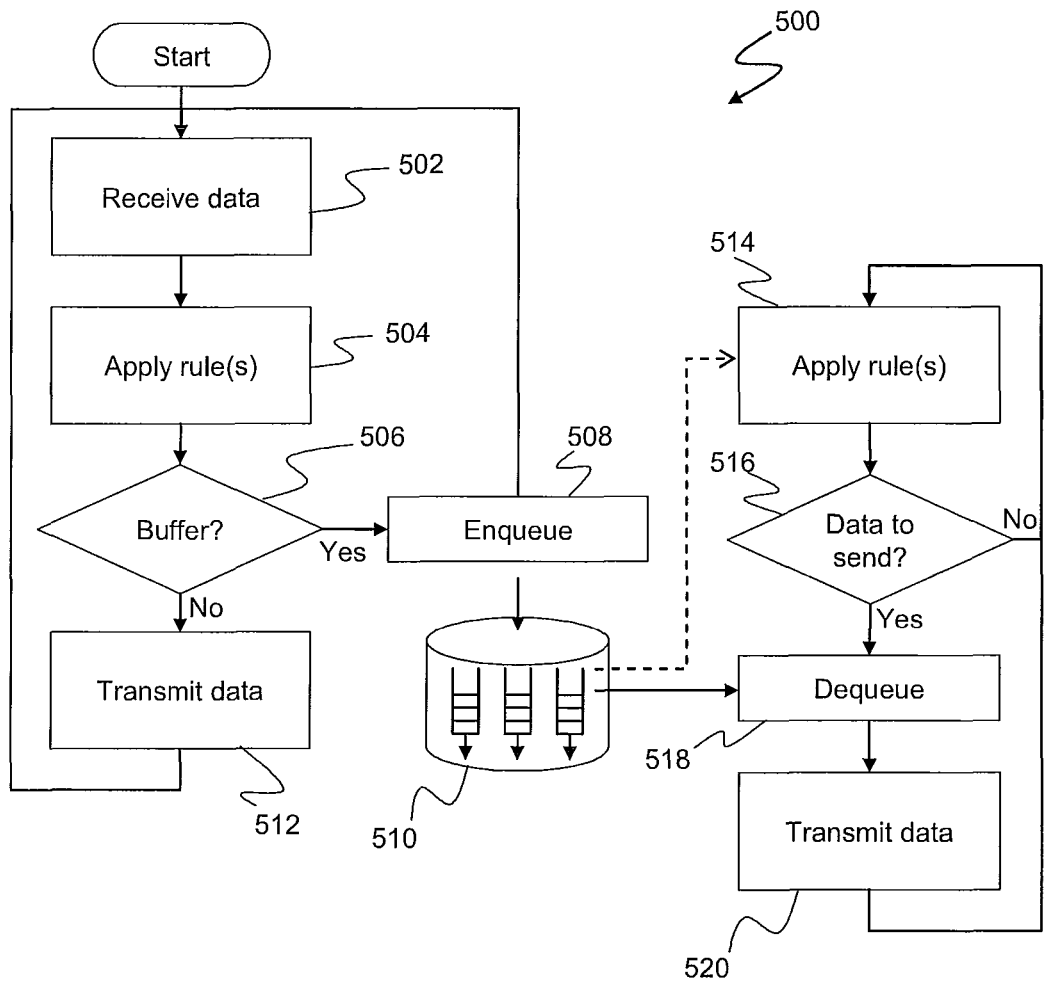
FIG. 5 is a flowchart illustrating general functions of a policy enforcer embodying the invention.

FIG. 5 is a flowchart illustrating general facilities provided by the policy enforcement function 350. As indicated in the system architecture block diagram 300, all data flows between user applications 336 executing on the application processor 108 within the user zone and the wireless network 104 pass through the policy enforcement function 350.

In general, all forms of data (i.e. packet data, voice data, text message data), flowing in either direction, are received 502 by the policy enforcement function. As shown in the flowchart 500 one or more policy rules may be applied 504 to the received data. The policies implemented by the policy enforcement function 350 enable rate limiting, traffic shaping, and other policing functions to be implemented in accordance with wireless network operator requirements and/or user application requests.

The policies applying to particular received data, associated with a corresponding communications flow, may indicate that it is time-sensitive (e.g. voice or video data), which should not be buffered or shaped. In this case, a decision 506 is made to transmit the data immediately 512. Alternatively, the received data may be enqueued 508 within a suitable storage facility 510.

The policy enforcement function 350 is also responsible for de-queuing and transmitting buffered data 510 in accordance with the relevant rules and policies. A process, thread or other facility within the policy enforcement function 350 monitors the queues 510, and applies rules 514 to determine whether and when queued data should be transmitted. When it is determined 516 that there is queued data due for transmission, it is de-queued 518 and transmitted 520 i.e. via the connection management function 348 for outgoing data, or via the communications channel 112 to the application processor 108 in the case of incoming data.

Figure 6:
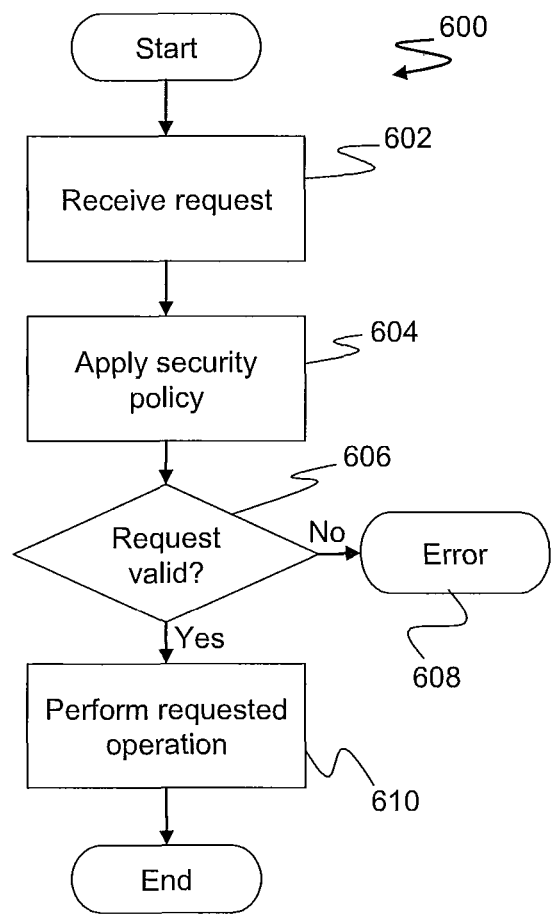
FIG. 6 is a flowchart illustrating a device security management function embodying the invention.

FIG. 6 shows a flowchart 600 illustrating a general operation of the security management function 344. The security management function 344 ensures that only authorised processes and entities are permitted access to data held within the secure storage facility 338. This data may include various configuration parameters of the communications management processor 106 and/or the baseband processor 102, along with code components, such as a secure bootloader, verified firmware images, and secure data that may be accessed by authorised applications executing on the application processor 108.

The security management function 344 receives requests 602 for storage and/or retrieval of contents of the secure storage facility 338. It applies relevant security policies 604 to determine whether the requests should be allowed or denied 606. If the process, entity, function or other facility requesting access is not authorised, then an error is generated 608, and access is denied. If the received request is in accordance with the relevant security policy, then access is allowed, and the requested operation performed 610.

As will be appreciated from the foregoing description, embodiments of the wireless computing and communications device 100 according to the present invention provide a flexible and secure platform for the development of wireless network-based applications. In particular, the provision of a communications management processor 106 which operates in a separate security domain from applications 336 executing on an applications processor 108 provides benefits to network operators, applications developers, and end-users. For network operators, access to the communications management processor 106, which provides a set of stable, documented interfaces, allows for improved device management, monitoring and control, enabling overall network performance and integrity to be maintained. User applications 336 are isolated from access to facilities which may adversely impact upon network performance.

At the same time, user data and applications 336 within the separate user zone of the application processor 108 are isolated from access by the network operator. Accordingly, user privacy concerns about network operator access to the device 100 are addressed.

Furthermore, user applications 336 can be developed within a familiar, standard operating system environment, independently of the particular features, facilities and interfaces of the baseband processor 102, and of the specific wireless network technology employed.

While specific embodiments have been described herein, in order to illustrate the general principles of operation of the invention, it will be understood that these are not intended to limit the scope of the invention. Various modifications, substitutions and variations will be apparent to persons skilled in the relevant arts of digital hardware and software design and development, and all such variations are encompassed by the invention, to the extent that they fall within the scope of the appended claims

The invention claimed is:

1. A wireless computing and communications device comprising:
   an application processor configured to execute user applications; and
   a first central processing unit (CPU) core comprising
      a baseband processor configured to implement operations providing access to a wireless communications network; and
      a communications management processor, in communication with the baseband processor via a first communications channel, and with the application processor via a second communications channel,
   wherein the CPU core is configured to execute a virtual machine manager (VMM), wherein each one of the baseband processor and the communications management processor executes within a distinct virtual machine (VM) managed by the VMM, and
   wherein the communications management processor is configured to operate in a separate security domain from the application processor, and to mediate all access to the wireless communications network by user applications executing on the application processor.

2. The device of claim 1, wherein the application processor execute within a distinct VM managed by the VMM executing on the first CPU core.

3. The device of claim 1 which comprises a second CPU core, in communication with the first CPU core via an inter-core communications channel, wherein the baseband processor and communications management processor execute within distinct VMs managed by the VMM on the first CPU core, and the application processor executes on the second CPU core.

4. The device of claim 3 wherein the first and second CPU cores are located on a single IC chip.

5. The device of claim 3 wherein the first and second CPU cores are located on separate IC chips.

6. The device of claim 1 wherein the communications management processor is configured to implement a security management function, said security management function restricting access to a secure configuration data store to functions executing within the communications management processor security domain.

7. The device of claim 6 wherein the communications management processor is further configured to receive and verify requests to modify contents of the secure configuration data store from trusted sources in the wireless communications network, and trusted applications executing on the application processor, and to update the contents in the event that the verification is successful.

8. The device of claim 1 wherein the communications management processor is configured to implement a database management function, said database management function communicating with the application processor via the second communications channel and providing access to a data store to applications executing on the application processor.

9. The device of claim 8 wherein the database management function is configured to selectively provide read-only or read/write access by applications executing on the application processor to information held in the data store.

10. The device of claim 1 wherein the communications management processor is configured to implement a connection management function, the connection management function communicating with the baseband processor via the first communications channel to provide access to the wireless communications network in response to requests received via the second communications channel from applications executing on the application processor.

11. The device of claim 10 wherein operations provided by the connection management function in response to requests comprise one or more of: connection set-up; connection termination; connection status; virtual connection set-up; and virtual connection termination.

12. The device of claim 10 wherein the connection management function is further configured to provide access to the wireless communications network in response to requests received from functions executing within the communications management processor security domain.

13. The device of claim 1 wherein the communications management processor is configured to implement a policy enforcement function, said policy enforcement function policing communication flows between the application processor and the baseband processor via the first and second communications channels, and controlling the communications flows in accordance with associated rules.

14. The device of claim 13 wherein the communication flows comprise one or more of: data flows; voice flows; and text-messaging flows.

15. The device of claim 13 wherein the policy enforcement function is configured to receive the associated rules from one or more of:
   a secure configuration data store within the communications management processor security domain;
   the wireless communications network via the first communications channel; and
   applications executing on the application processor via the second communications channel.

16. The device of claim 13 wherein each associated rule comprises a combination of one or more of:
   an interface to which the rule is applied;
   maximum and/or minimum sustained throughput per unit time;
   maximum permissible burst rate;
   packet size;
   queuing mechanisms;
   queue buffer sizes;
   application types;
   source/destination address;
   source/destination port;
   time schedules;
   match actions; and
   rule priority.

17. The device of claim 13 wherein each associated rule is applied to one or more of:
   a corresponding application executing on the application processor;
   all applications executing on the application processor; and
   one or more communication flows.

18. The device of claim 13 wherein the policy enforcement function is further configured to control timing and/or rate of connection requests or transmissions to the wireless network according to wireless network configuration rules.

19. The device of claim 1 which comprises a diagnostics, monitoring and control function configured to provide one or more diagnostic/management interfaces accessible via the wireless network.

20. The device of claim 19 wherein diagnostic/management interfaces include one or more of SSH, SNMP, IEEE 802.1ag (ITU-T Y.1731), TR-069, OMA-DM and Web UI.

21. A method of operating a wireless computing and communications device comprising:

executing a virtual machine manager (VMM) on a first central processing unit (CPU) core of the wireless computing and communications device; and executing wireless communications management functions by a communications management processor in communication with a baseband processor via a first communication channel and with an application processor via a second communication channel, wherein each one of the baseband processor and the communications management processor executes within a distinct virtual machine (VM) managed by the VMM executing on the first CPU core, wherein the baseband processor is configured to implement operations providing access to a wireless communications network, the application processor is configured to execute user applications, and wherein the wireless communications management functions execute within a separate security domain from the application processor, and mediate all access to the wireless communications network by user applications executing on the application processor.

22. The method of claim 21 wherein the communications management functions comprise a security management function, and the method comprises the security management function restricting access to a secure configuration data store to functions executing within the communications management function security domain.

23. The method of claim 21 wherein the communications management functions comprise a database management function, and the method comprises the database management function communicating with the application processor via the second communications channel and providing access to a data store to applications executing on the application processor.

24. The method of claim 21 wherein the communications management functions comprise a connection management function, and the method comprises the connection management function communicating with the baseband processor via the first communications channel to provide access to the wireless communications network in response to requests received via the second communications channel from applications executing on the application processor.

25. The method of claim 21 wherein the communications management functions comprise a policy enforcement function, and the method comprises the policy enforcement function policing communication flows between the application processor and the baseband processor via the first and second communication channels and controlling the communication flows in accordance with associated rules.

26. The method of claim 21 wherein the communications management functions comprise a diagnostics, monitoring and control function, and the method comprises the diagnostics, monitoring and control function implementing one or more diagnostic/management interfaces accessible via the wireless communications network.

* * * * *